Nov. 25, 1969 — G. G. KLIEWER — 3,479,876

SUCCESSIVE TEMPERATURE INDICATOR

Filed Aug. 25, 1967 — 2 Sheets-Sheet 1

INVENTOR.
GEORGE G. KLIEWER
BY Naylor & Neal
ATTORNEYS

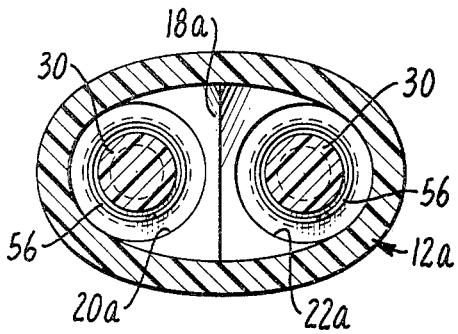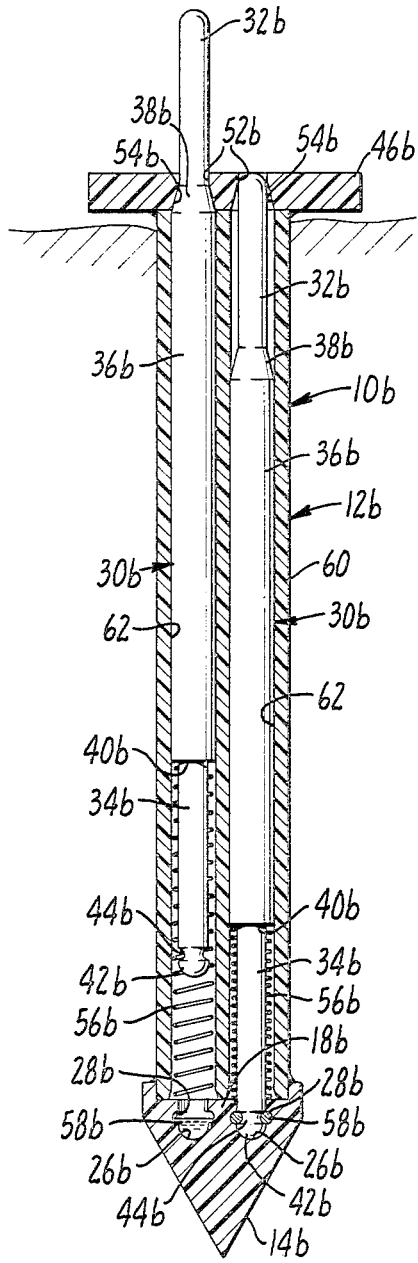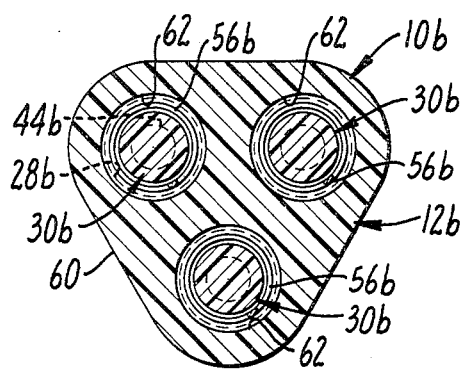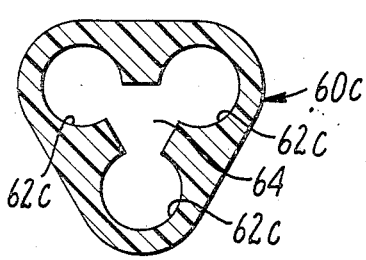

United States Patent Office 3,479,876
Patented Nov. 25, 1969

3,479,876
SUCCESSIVE TEMPERATURE INDICATOR
George G. Kliewer, Fresno, Calif., assignor to Commodity Marketers, Inc., Fresno, Calif., a corporation of California
Filed Aug. 25, 1967, Ser. No. 663,390
Int. Cl. G01k 11/00
U.S. Cl. 73—358                3 Claims

ABSTRACT OF THE DISCLOSURE

The indicator comprises, a tubular housing having an interior provided with a plurality or longitudinally extending sections, each of which slidably receives an indicator rod for movement between retracted and extended positions relative to the housing. Springs received in the sections resiliently urge each of the rods towards the extended position and temperature responsive retention devices operatively interposed between each of the rods and the housing normally retain the rods against extension.

---

The present invention relates to a temperature sensing device adapted to be inserted into an article of food to indicate the attainment of successively increasing predetermined temperatures. The invention is especially concerned with such a device which may be marketed in a condition incorporated into an article of food.

In the prior art, temperature signaling devices designed to be incorporated into food commodities for marketing therewith have become well known. These are typified by the devices shown in my prior Patent Nos. 3,140,611 and 3,280,629 and my co-pending application Ser. No. 410,-603, filed Nov. 12, 1964. The disclosures of my prior patents and pending application are particularly pertinent to the subject invention in that they relate to devices employing extensible rods for indicating purposes. These devices, however, employ but a single rod, whereas the present invention employs a plurality of rods.

While single rod indicating devices of the prior art, such as that disclosed in my Patent No. 3,140,611, have provided for the indication of a plurality of predetermined temperatures, these devices have not been well accepted for this purpose. This has resulted, primarily, for two reasons. First, these devices have required relatively complicated multistaged triggering arrangements. Secondly, these devices have not provided for the ready discerning of the temperatures indicated thereby. The latter characteristic is inherent with the employment of a single rod for the indication of a plurality of temperatures.

In summary, the present invention may be said to reside in a temperature signaling device of the indicator rod type employing a plurality of rods for the indication, respectively, of a plurality of predetermined temperatures. The device employs a single tubular housing provided with longitudinally extending sections in which the rods are slidably received. The housing also contains resilient compression means to urge the rods to extended positions relative to the housing and temperature responsive retention means which normally hold the rods against extension. The latter means are designed to, successively, release the rods at predetermined temperatures as the housing is heated. In the preferred embodiments of the invention, a common barrier is provided to maintain the retention means for the respective rods in mutually isolated relationship. The preferred embodiments also incorporate fluide structures to prevent interference between the respective rods and the resilient compression means cooperating therewith.

It is, accordingly, a principal object of the present invention to provide a temperature signaling device of the indicater rod type capable of sensing and signaling a plurality of predetermined temperatures.

Another and related object of the invention is to provide such a device incorporating a plurality of indicator rods and associated operating structure therefor in a single housing.

These and other objects of the invention will become more apparent when viewed in light of the rollowing detailed description and accompanying drawings wherein:

FIG. 5 is a sectional view, similar to FIG. 3, with all indicator rods shown therein retracted, of a second embodiuent of the invention;

FIG. 6 is a sectional view, similar to FIG. 4, of a third embodiment of the invention;

FIG. 7 is a tranverse sectional view of the third embodiment; and

FIG. 8 is a transverse sectional view of a modified housing construction suitable for incorporation into the third embodiment.

Figure 1:
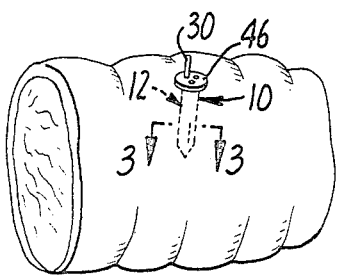
FIG. 1 is a perspective view of a beef roast having a first embodiment of the temperature indicator of the present invention inserted thereinto.

Referring now specifically to the embodiment illustrated in FIGS. 1–4, the indicator of this embodiment is designated in its entirety by the numeral 10. It comprises, as its basic element, a tubular housing 12 having a closed lower end 14 and an open upper end formed with a collar 16 therearound. The housing is fabricated of a thermally conductive imperforate material, such as nylon or the polyethylene or styrene plastics. While these materials are not particularly good thermal conductors, they are preferred for reasons of economics.

The interior of the housing 12 comprises an open cavity of generally triangular configuration provided with three longitudinally extending sections. Each of the sections is defined by an interior corner portion of the housing and a common barrier 18 formed integrally with the lower end of the housing. The barrier comprises, in part, an upstanding portion of generally pyramidical configuration extending partially into the interior of the housing. This potrion includes semi-cylindrical cut-outs, designated by the numerals 20, 22 and 24, respectively, facing each of the interior corner portions of the housing. The barrier 18 also functions to mutually isolate recesses 26 of generally hemispherical configuration formed in the end 14 in aligned communication, respectively, with each of the longitudinally extending sections of the housing. Each of the recesses 26 is formed with an annular groove 28 therearound disposed in spaced relationship to its lower extremity.

Figure 4:
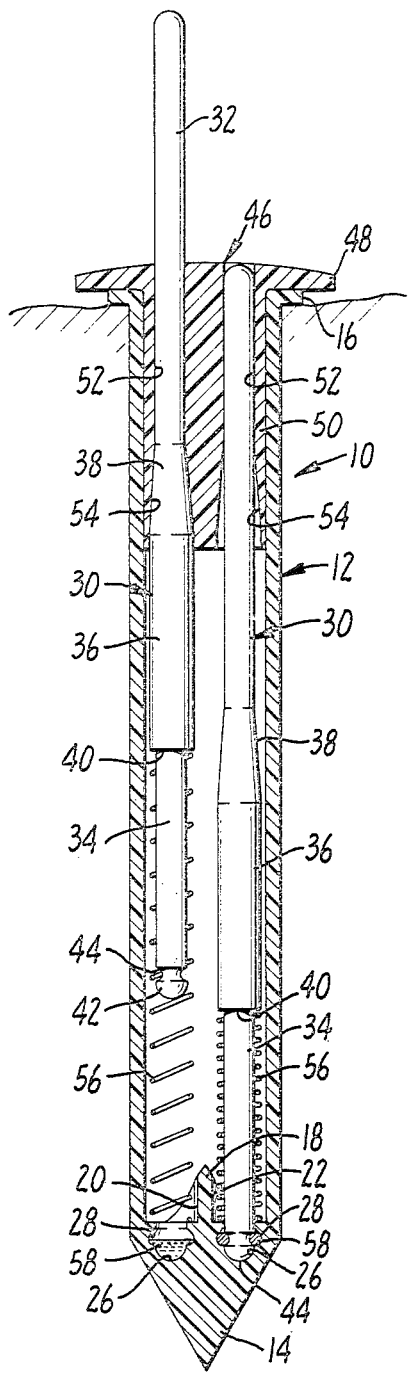
FIG. 4 is a sectional view taken on the plane designated by line 4—4 in FIG. 3.

The longitudinally extending sections of the housing each slidably receive an indicator rod 30. The rods 30 are identical in construction and each comprise: upper and lower cylindrical sections 32 and 34, respectively; a central cylindrical section 36 of larger cross section than the sections 32 and 34; a tapered shoulder 38 at the upper end of the section 36; an abrupt shoulder 40 at the lower end of the section 36; a hemispherical lower end 42; and, an annular groove 44 formed around the section 34 in spaced relationship to the distal portion of the lower end 42. The ends 42 are proportioned for seated engagement with the recesses 26, as can be seen at the right of FIG. 4. In this condition, the grooves 28 and 44 assume facing relationship to define a toroidal chamber therebetween. As will become more apparent subsequently, the chamber thus provided for each of the rods facilitates its retention in a manner similar to that disclosed in my aforementioned co-pending application Ser. No. 410,603.

The rods 30 are guided for slidable movement within the housing 12 by a cap 46. The cap comprises a flanged head 48 disposed in abutting engagement over the collar 16 and an elongated body portion 50 snugly received within the upper end of the housing. The body portion 50 has passages 52 extending therethrough in alignment, respectively, with each of the longitudinaly extending sections of the housing. Each passage 52 is proportioned to slidably receive the section 32 of the rod in alignment therewith over an elongated length. This provides for guiding of the rods within the housing. The passages 52 are also provided with tapered sections 54 disposed to assume seated engagement with the sections 38 upon extension of the rods.

Extension of the respective rods 30 is provided by coil springs 56 received around the sections 34. Each of these springs is interposed between the shoulder 40 of the rod upon which it is received and the cut-out in the barrier 18 opposed thereto. The springs 56 are disposed to urge the rods to the fully extended condition, as illustrated at the left of FIG. 4. The sections 34 extend into the springs over a length sufficient to assure alignment of each of the springs the rod cooperating therewith, irrespective of the extended or retracted condition of the rod.

As noted in the foregoing discussion, the rods 30 are held in retracted condition within the housing 12 through a retention arrangement similar to that of my aforementioned co-pending application Ser. No. 410,603. This arrangement comprises, in addition to the grooves 28 and 44, a slug of alloy received in each of the recesses 26. While all of these slugs are designated by the numeral 58 in the drawings, they differ from each other in their melting temperature. Specifically, the slugs are provided to melt at successively increasing temperatures. When the indicator is designed for use with beef, these temperatures would correspond, substantially, to the temperatures at which beef is rare, medium and well done, respectively. As a result of this interrelationship of the slugs, when the indicator is used in a beef roast, as illustrated in FIG. 1, the rods will be successively released as the cooked condition of the roast progresses from rare to well done. This progressive sequence is diagrammatically illustrated in FIG. 2.

In fabrication, the indicator 10 is first preassembled by the following steps:

(1) Inserting alloy slugs into each of the recesses 26;

(2) Inserting the springs and rods into the longitudinally extending sections of the housing so that each rod and the spring received therearound is longitudinally aligned with one of the recesses 26; and (3) Forcing the cap 46 into the housing and into guiding relationship with the rods received therein.

To accomplish these steps, any suitable fixtures may be employed. Once the indicator is thus preassembled, the housing is raised to a temperature above the melting point of all of the slugs of alloy received therein. Upon this occurrence, the rods 32 are completely depressed to displace the slugs of alloy into toroidal chambers therearound, as seen at the right of FIG. 4. Once the alloy slugs are so displaced, fabrication is completed by cooling the housing to a temperature wherein all of the alloy slugs are solidified. In this condition, toroidally disposed slugs function to maintain all of the rods in retracted condition.

It is to be understood that the foregoing fabrication steps are, preferably, effected with the housing in an upright condition. This assures that the slugs will not be inadvertently dislodged from the recesses 26. It is also noted that, preferably, the recesses 26 and ends 42 are made so that, upon displacement of the slugs into the toroidal chambers, a thin film of alloy remains between the recesses and ends.

Referring now to the second embodiment of the indicator, as illustrated in FIG. 5, this is designated in its entirety by the numeral. The indicator differs from the aforedescribed indicator 10 in that it is provided with two, rather than three, indicator rods. To accommodate this difference, the housing of the indicator, designated by the numeral 12a, is of generally oval cross-sectional configuration and includes an interior cavity divided into two sections, rather than three. These sections are defined by the interior walls of the housing and a barrier 18a formed in and projecting upwardly from the lower end of the housing. The barrier 18a is similar to the barrier 18 in that it is of peaked configuration and includes cut-outs 20a and 22a similar to the cut-outs 20 and 22, respectively.

The indicator rods and springs of the FIG. 5 embodiment correspond identically to those of the FIGS. 1–4 embodiment and, accordingly, are designated by like numerals. Although not illustrated, it is also to be understood that the retention structure cooperating with the rods of the FIG. 5 embodiment corresponds to that of the FIGS. 1–4 embodiment. The FIG. 5 embodiment is also provided with a cap (not illustrated) corresponding in function to the cap 46 of the FIGS. 1–4 embodiment, but differing therefrom in that it is provided with but two passages and formed of oval cross-section for receipt in the housing 12a.

The FIG. 5 embodiment is assembled similarly to the FIGS. 1–4 embodiment, with the exception that two, rather than three, alloy slugs of different melting temperature are provided. The slugs are employed to retain the respective indicator rods and, typically, are selected to have melting temperatures corresponding substantially to the cooking temperatures at which beef is rare and medium. As a result, when the indicator 10a is used in cooking, it operates similarly to the rare and medium indications diagrammatically illustrated in FIG. 2.

Referring now to the third embodiment of the indicator, as illustrated in FIGS. 6 and 7, this is designated in its entirety by the numeral 10b. This embodiment differs from that of FIGS. 1–4, primarily, in that the longitudinally extending sections of the housing are mutually isolated from fluid communication. Since the various components of the FIGS. 6 and 7 embodiment correspond in mode of operation to the components of the FIGS. 1–4 embodiment, they are designated by like numerals followed by the suffix b, as follows:

| | |
|---|---|
| Housing | 12b |
| Lower end | 14b |
| Barrier | 18b |
| Recesses | 26b |
| Annular grooves | 28b |
| Indicator rods | 30b |
| Upper cylindrical section | 32b |
| Lower cylindrical section | 34b |
| Central cylindrical section | 36b |
| Tapered shoulder | 38b |
| Abrupt shoulder | 40b |
| Hemispherical lower end | 42b |
| Annular groove | 44b |
| Cap | 46b |
| Passages | 52b |
| Tapered section | 54b |
| Coil springs | 56b |
| Alloy | 58b |

From this list, it can be seen that the FIGS. 6 and 7 embodiment does not include components corresponding to the following components of the FIGS. 1–4 embodiment: collar 16; cut-outs 20–24, inclusive, head 48; and, body portion 50.

The indicator 10b includes no collar, corresponding to the collar 16, because the housing 12b is formed of an extruded section, designated by the numeral 60, having the lower end 14b welded or otherwise sealingly secured thereto. The section 60 is of rectilinear configuration and includes three mutually isolated passages 62 extending therethrough. These passages define the longitudinally extending sections of the indicator 10b in which the rods 30b are slidably received. Guiding of the rods is provided by slidable engagement of the sections 36b thereof with the interior of the passages 62. With this arrangement, the barrier 18b is not provided with a peaked or pyramidical upstanding portion. As a result, no cut-outs, corresponding to the cut-outs 20, 22 and 24 of the FIGS. 1–4 embodiment are found in the FIGS. 6 and 7 embodiment.

The extruded character of the housing section 60 also alleviates the need for a cap having a head 48 and body portion 50, as provided on the cap 46. As a result, the cap 46b is of flat disc-shaped configuration. It is sealingly held to the section 60 by welding or other suitable techniques. The passages 52b and tapered section 54b are similar to the corresponding components of the FIGS. 1–4 embodiment in that they provide for extension of the rods 36b through the cap 46b and for sealing engagement of the rods with the cap upon extension. The passages 52b do not, however, provide the same guiding function as the passages 52. This results because guiding of the rods 36b is provided, primarily, by the passages 62b.

The FIGS. 6 and 7 embodiment may be assembled in a manner corresponding substantially to that of the FIGS. 1–4 embodiment. In this case, however, the extruded section 60 and lower end 40 would be secured together before assembly of the remaining components. Securing of the cap 46b would also be effected by a technique, such as welding, differing from that employed for the cap 46.

It is also noted that the open ended characteristic of the extruded section 60 facilitates assembly techniques wherein the rods, springs and alloy slugs are loaded from the bottom of the section 60 (as viewed in FIG. 6). Such techniques would, naturally, require that the lower end 14b be secured in place after loading.

Figure 2:
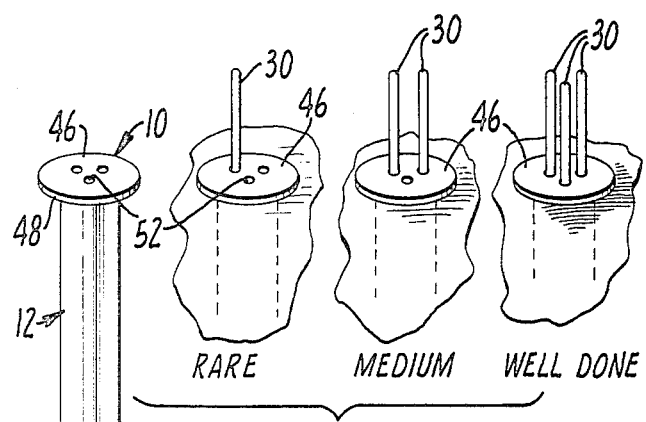
FIG. 2 is a perspective view diagrammatically illustrating the temperature indicator of the first embodiment, sequentially, in the different stages of its operation.
Figure 3:
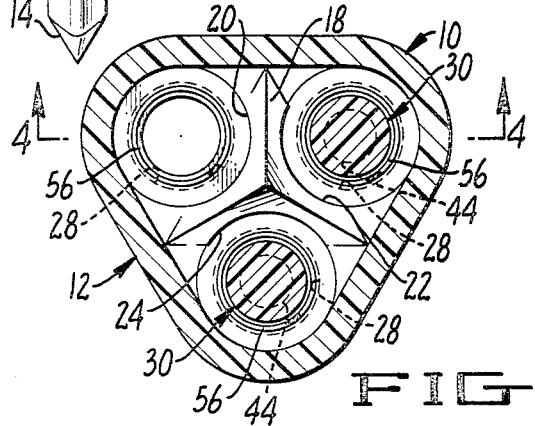
FIG. 3 is a sectional view taken on the plane designated by line 3—3 in FIG. 1.

The indicator 10b of the FIGS. 6 and 7 embodiment operates in a manner corresponding identically to that of the indicator 10, as diagrammatically illustrated in FIG. 2. In this operation, the indicator 10b has the advantage, as compared to the indicator 10, that escape of melted alloy from one of the longitudinal sections within the housing to another is positively prevented. This characteristic assures that the melted alloy in one of the sections will neither foul the operation of the other sections nor escape therethrough. It is noted that each of the sections is sealed as the shoulder 38b of the rod therein abuts with the tapered section 54b aligned therewith.

FIG. 8 illustrates an extruded housing section, designated by the numeral 60c, suitable for incorporation into the FIGS. 6 and 7 embodiment in place of the section 60. The section 60c differs from the section 60 only in that the longitudinally extending passages therein are connected by an open central portion 64. The passages in the section 60, designated by the numeral 62c are adapted to provide a rod guiding function in a manner corresponding to the passages 62. Naturally, the passages 62b do not mutually isolate the longitudinal sections defined thereby from fluid communication.

The section 60c has the advantage, as compared to the section 60, that it may be formed with a die incorporating a simplified unitary core. Such a core would have a shape corresponding to the composite cross-section of the passages 62c and the portion 64.

From the foregoing description, it is believed clear that the present invention distinguishes from the prior art and enables the attainment of the objects initially set forth herein.

What is claimed is:

1. A signaling device adapted to be inserted into an article to indicate the successive attainment of a plurality of predetermined internal temperatures upon the heating thereof, said device comprising:

(a) a tubular housing formed of thermally conductive imperforate material, said housing being closed at one end and open at the other end and having:
 (1) a bore therein comprised of a plurality of longitudinally extending lateral sections extending between the open and closed ends thereof;
 (2) a barrier at the closed end of said housing defining mutually isolated recesses, one of which is in longitudinal alignment and open communication with each of said lateral sections;
 (3) a cap secured to said housing and covering the open end of said housing, said cap having apertures extending therethrough, one of which is disposed in longitudinal alignment and open communication with each of said lateral sections; and,
 (4) an open central section extending over the full length of said bore between said barrier and cap to establish open communication between said lateral sections;
(b) an indicator rod slidably received in each of said lateral sections for movement through the aperture in the cap aligned therewith between positions retracted and extended relative to said housing;
(c) guide means fixed relative to said housing and disposed within said bore for slidable engagement with said rods to guide each of said rods between the retracted and extended positions in an independent path axially aligned with the lateral section within which the rod is received;
(d) resilient means disposed, respectively, between each of said rods and said housing to normally urge said rods to an extended position relative to said housing; and,
(e) temperature responsive retention means operatively associated, respectively, with each of said rods and the recess in aligned communication with the section in which the rod is received, said means each functioning to normally retain the rod associated therewith in retracted position and being adapted to release said rods, successively, at predetermined temperatures upon the heating of said housing.

2. A device according to claim 1 wherein said resilient means comprise compression coil springs interposed, respectively, between each of said rods and said barrier; and further comprising retention means on said barrier engaging said springs to maintain each of said springs in alignment with the recess longitudinally aligned with the section in which the rod opposed thereto is received.

3. A device according to claim 2 wherein:
(a) the apertures in said cap slidably engage the rods disposed for movement therethrough to maintain said rods in longitudinal alignment therewith and, thus, provide the guide means; and,
(b) the rods extend into the springs opposed thereto to maintain longitudinal alignment therewith.

References Cited
UNITED STATES PATENTS

| | | | |
|---|---|---|---|
| 945,978 | 1/1910 | Nielsen et al. | 73—358 X |
| 2,915,405 | 12/1959 | Hammond et al. | |
| 3,140,611 | 7/1964 | Kliewer | 73—358 |
| 3,290,942 | 12/1966 | Carbaugh et al. | 73—358 |

FOREIGN PATENTS

| | | |
|---|---|---|
| 368,898 | 2/1923 | Germany. |
| 428,091 | 4/1926 | Germany. |

LOUIS R. PRINCE, Primary Examiner

D. M. YASICH, Assistant Examiner

U.S. Cl. X.R.

99—192